United States Patent [19]
Fukunaga

[11] Patent Number: 5,627,948
[45] Date of Patent: May 6, 1997

[54] INFORMATION PROCESSING APPARATUS AND METHOD FOR DISPLAYING FORMAT INFORMATION FOR A LINE TO WHICH A CURSOR IS SHIFTED BY SCROLLING IN A FORMAT DISPLAY AREA

[75] Inventor: Koji Fukunaga, Tokyo, Japan

[73] Assignee: Canon Kabushiki Kaisha, Tokyo, Japan

[21] Appl. No.: 320,554

[22] Filed: Oct. 11, 1994

Related U.S. Application Data

[63] Continuation of Ser. No. 921,592, Jul. 31, 1992, abandoned, which is a continuation of Ser. No. 542,647, Jun. 25, 1990, abandoned, which is a continuation of Ser. No. 195,813, May 19, 1988, abandoned, which is a continuation of Ser. No. 707,863, Mar. 4, 1985, abandoned.

[30] Foreign Application Priority Data

Mar. 9, 1984 [JP] Japan ................ 59-44106

[51] Int. Cl.$^6$ ................................ G06F 3/153
[52] U.S. Cl. ............... 395/111; 395/101; 345/145; 345/157
[58] Field of Search .................. 340/709; 395/148, 395/150, 800, 101, 111; 345/145, 157

[56] References Cited

U.S. PATENT DOCUMENTS

| | | |
|---|---|---|
| 3,648,271 | 3/1972 | McConnell et al. . |
| 3,810,107 | 5/1974 | Goldman et al. ............ 395/148 |
| 4,121,228 | 10/1978 | Cowe et al. ................. 340/735 |
| 4,160,981 | 7/1979 | Raney, Jr. .................. 364/419 |
| 4,189,727 | 2/1980 | Vaughn, Jr. . |
| 4,258,361 | 3/1981 | Hydes et al. ................ 340/735 |
| 4,425,629 | 1/1984 | Cason et al. ................ 395/148 |
| 4,445,194 | 4/1984 | Cason et al. . |
| 4,447,888 | 5/1984 | Kuecker et al. ............. 395/148 |
| 4,491,933 | 1/1985 | Ursin et al. . |
| 4,495,490 | 1/1985 | Hopper et al. .............. 340/709 |
| 4,506,343 | 3/1985 | Shipp, Jr. et al. . |
| 4,627,015 | 12/1986 | Stephens .................... 395/147 |
| 4,663,731 | 5/1987 | Ikegami et al. ............. 340/721 |
| 4,686,649 | 8/1987 | Rush et al. . |
| 4,897,804 | 1/1990 | Kawakami .................. 364/521 |

FOREIGN PATENT DOCUMENTS 0108520 5/1984 European Pat. Off. .

OTHER PUBLICATIONS

"Automated Patent System (APS) sections 1.5.2 Text Terminal to 1.5.2.2 Text Terminal: APS and Text Search Logon" pp. 1-24-1-26.

*Primary Examiner*—Krisna Lim
*Attorney, Agent, or Firm*—Fitzpatrick, Cella, Harper & Scinto

[57] ABSTRACT

An information processing apparatus for processing document information including image information has a printer, a line number register, registers for storing format information for each line displayed on a screen of a CRT display, and a processing section for retrieving the format information corresponding to a portion of document information at which the cursor is currently located and for allowing the display to display the document information together with the format information.

14 Claims, 7 Drawing Sheets

INFORMATION PROCESSING APPARATUS AND METHOD FOR DISPLAYING FORMAT INFORMATION FOR A LINE TO WHICH A CURSOR IS SHIFTED BY SCROLLING IN A FORMAT DISPLAY AREA

This application is a continuation of application Ser. No. 07/921,592 filed on Jul. 31, 1992, now abandoned which is a continuation of application Ser, No. 07/542,647 filed Jun. 25, 1990, now abandoned, which is a continuation of application Ser. No. 07/195,813 filed May 19, 1988, now abandoned, which is a continuation of application Ser. No. 06/707,863 filed Mar. 4, 1985, now abandoned.

BACKGROUND OF THE INVENTION

1. Field of the Invention

The present invention relates to an information processing apparatus and, more particularly, to an information processing apparatus for forming or editing a sentence or a table.

The present invention also relates to an information processing apparatus for performing display control of format information for each predetermined region.

2. Description of the Prior Art

A wordprocessor is a typical example of a processing apparatus handling document information including image information. When a sentence is formed and edited with a wordprocessor, a format display is normally provided at a part of a screen so as to allow easy input operation. Functions included in such a format display are generally the left and right margins, tab set position and the like. In an apparatus of this type, a sentence of a plurality of lines can be displayed at one time. The format functions displayed at, e.g., the uppermost portion of the screen apply to all lines of the displayed sentence. However, there are occasions when it is desired to make changes in a sentence by line or by section. When a sentence is being formed, it is advantageous if the format can be changed while the sentence is being formed. Such changes in format may include changes in the left margin or tab set position. Once the format is changed, the established format applies to the remaining portion of the sentence. This means that when editing is performed for a portion of the sentence previously entered, inconvenience occurs. As a solution to this problem, it has been proposed to display both previous and current formats when need to change the format arises. With this arrangement, the operator need not then change the current format every time the previous format must be restored, and can simply make a selection between the two formats. However, this arrangement requires a large space in the screen to display both formats, and space for displaying the formed sentence becomes limited. It is also difficult to establish correspondence of the sentence with the currently selected format.

SUMMARY OF THE INVENTION

The present invention has been made in consideration of this and has as its object to provide an information processing apparatus which is very simple to operate.

It is another object of the present invention to provide an information processing apparatus in which it is unnecessary to change the format every time a need for change arises.

It is still another object of the present invention to provide an information processing apparatus which allows easy formation and editing of sentence or table information without interference from a format display.

It is still another object of the present invention to provide an information processing apparatus which allows easy establishment of correspondence between a format display and a screen used for editing a sentence or the like.

It is still another object of the present invention to produce format information which corresponds to document information at which a cursor is presently located.

It is still another object of the present invention to divide document information in accordance with format information corresponding thereto and to display format information in accordance with each divided region at which the cursor is presently located.

It is still another object of the present invention to provide an information processing apparatus for performing display control of format information for each predetermined region.

DETAILED DESCRIPTION OF THE PREFERRED EMBODIMENT

Figure 1:
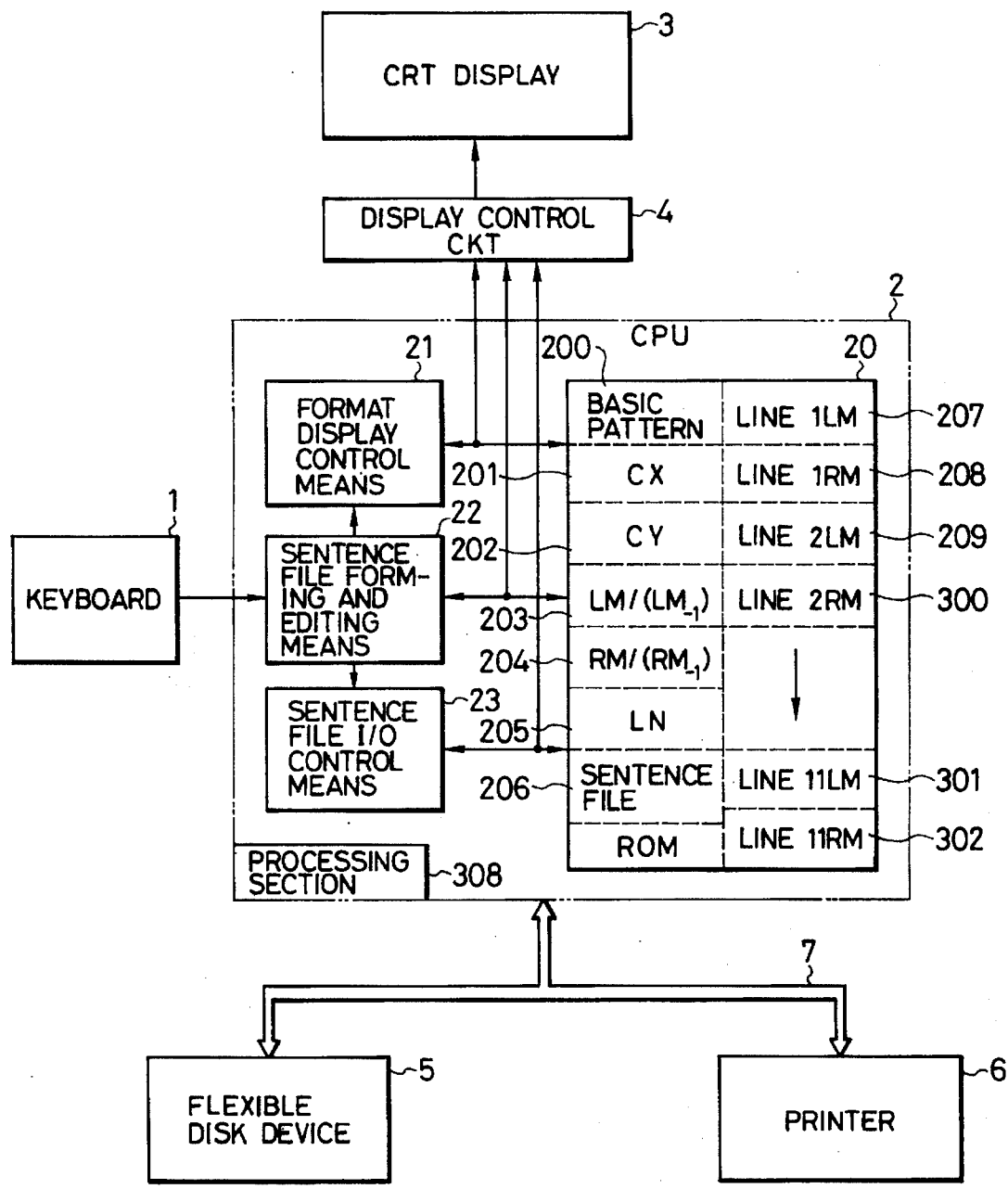
FIG. 1 is a block diagram showing the configuration of a wordprocessor according to an embodiment of the present invention.

The preferred embodiment of the present invention will be described in detail with reference to the accompanying drawings. FIG. 1 is a block diagram showing the configuration of a wordprocessor according to the preferred embodiment of the present invention (to be referred to an apparatus of the present invention). Referring to FIG. 1, a keyboard 1 is used to input characters or function codes. A central processing unit (CPU) 2 controls the overall apparatus of the present invention. A CRT or LED display 3 can display a plurality of lines of characters. A display control circuit 4 controls the display 3. A flexible disk device 5 stores various sentence files. A printer 6 is used to print out sentence files after editing. A cable 7 connects the input/output devices 5 and 6 with the CPU 2.

In the CPU 2, the memory map of a main memory 20 is illustrated together with various functions which can be performed by a program stored in a ROM. Thus, the main memory 20 stores the program (ROM) and various information used for executing the program. The main memory 20 includes a basic pattern 200 as a basic for a format to be displayed, a cursor register 201 for holding a horizontal cursor position (column number CX) on the screen, a cursor register 202 for holding a vertical cursor position (row number CY) on the screen, a left margin register 203 for holding the position (column number LM) of the left margin function in the displayed format, a right margin register 204 for holding the right margin position (column number RM), a line number register 205 for holding the value (LN) obtained by subtracting 1 from the displayed line number of each sentence line, a sentence file 206 for performing the sentence job, a first line left margin memory 207 for holding the left position (line 1LM) as a format applicable to the first line of the sentence display area, a first line right margin memory 208 for storing the right margin position (line 1RM) of the same, second line margin memories 209 and 300 for respectively storing the left/right margin positions (line 2LM, line 2RM) as a format applicable to the second line of the sentence display area, and eleventh line margin memories 301 and 302 corresponding to the 11th line of the sentence display area. The memories 207 to 302 are arranged in a table-like manner, and the start address of each thereof can be referred to by FMT when the program is executed (steps 71, 73 in FIG. 6).

Function blocks realized by the program include a format display control means 21 for displaying the format at the uppermost position on the display screen, a sentence file forming & editing means 22 for forming a sentence file 206 at a predetermined area in the main memory 20 or for editing a sentence file 206 read in from the flexible disk device 5, and a sentence file I/O control means 23 for performing input/output control of the sentence file 206 between the main memory 20 and the external input/output devices 5 and 6. A processing section 308 reads out the program stored in the ROM and controls the format display control means 21, the sentence file forming & editing processing means 22 and the sentence file I/O control means 23 in the manner described above.

Figure 2:
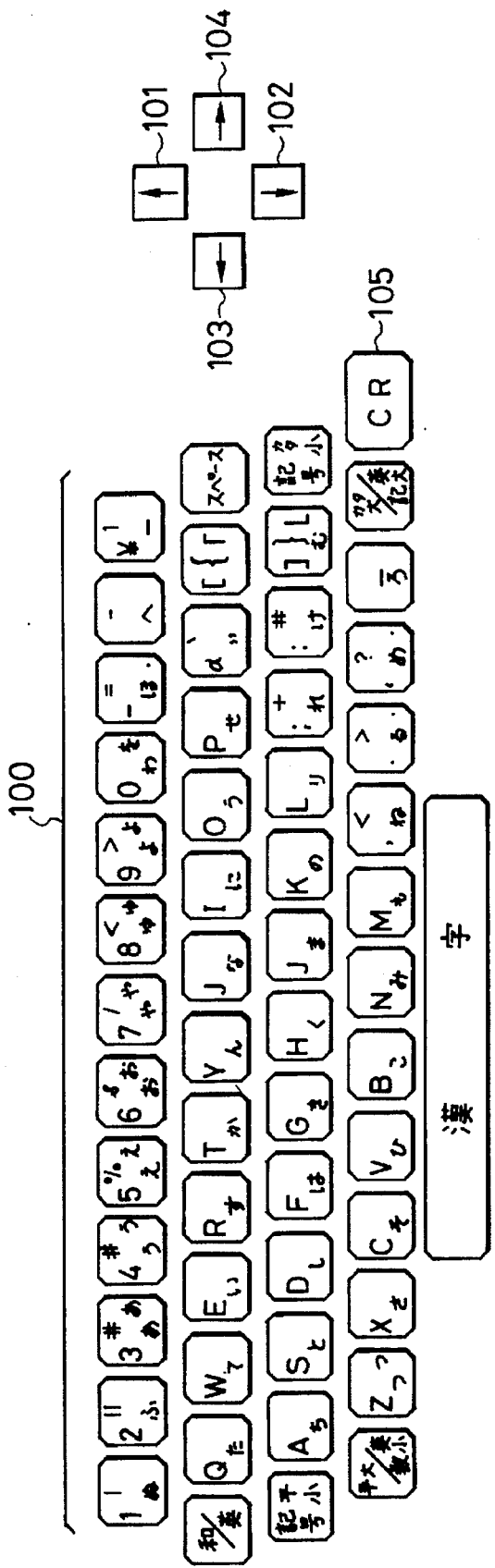
FIG. 2 is a top view of a keyboard of the wordprocessor according to the present invention.

FIG. 2 is a top view of the keyboard 1. Referring to FIG. 2, a typewriter keyboard 1 is used to input normal characters, symbols and the like. An up cursor shift key 101 is for shifting the cursor upward. A down cursor shift key 102 is for shifting the cursor downward. A left cursor shift key 103 is for shifting the cursor to the left. A right cursor shift key 104 is for shifting the cursor to the right. A cursor return key (CR) 105 is for performing cursor return operation.

Figure 3:
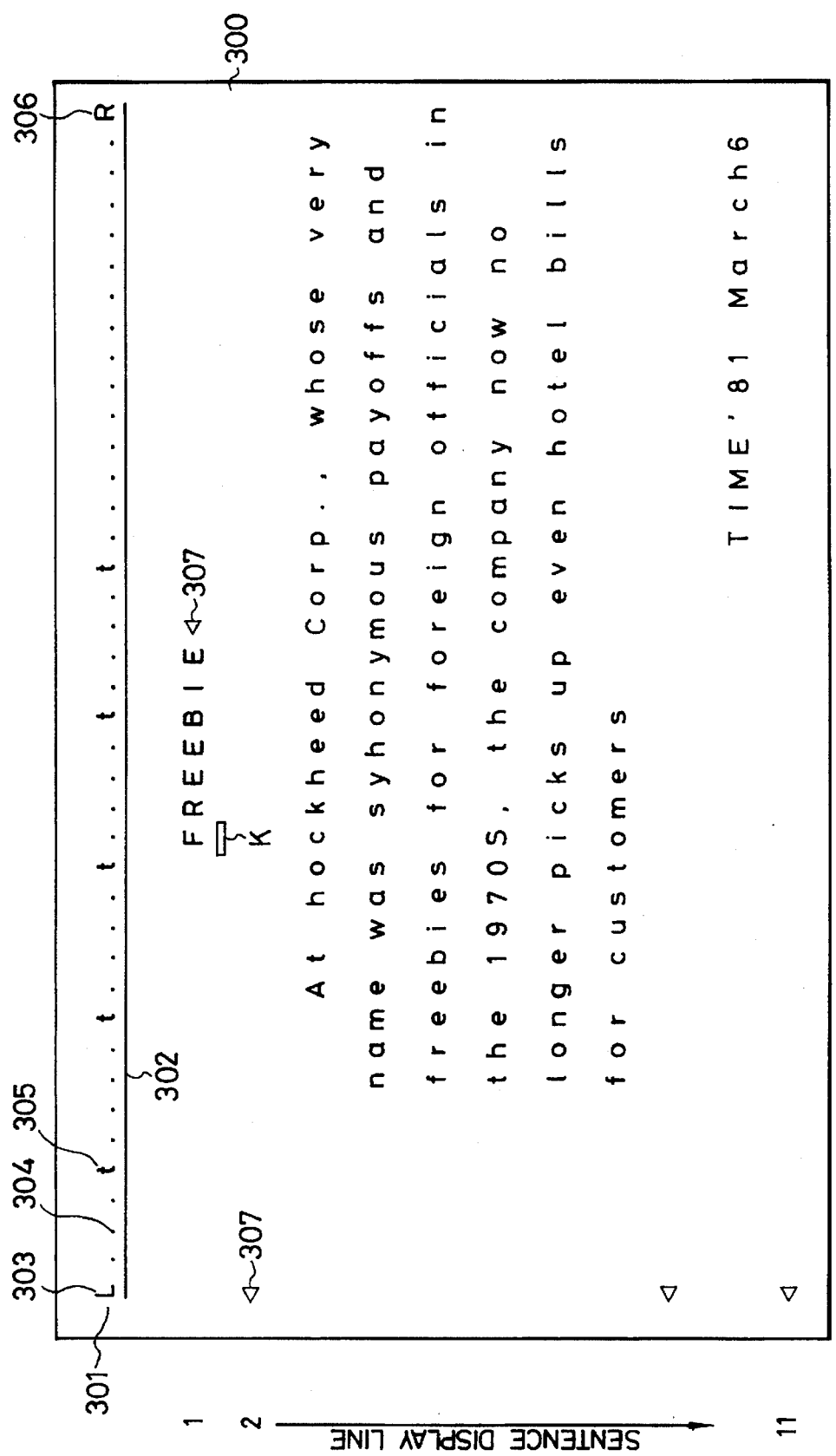
FIG. 3 is a representation showing an example of information display in the wordprocessor according to the present invention.

The mode of operation of the apparatus of the present invention having the above configuration will be described below. FIG. 3 shows a display example of a format in the apparatus of the present invention. Referring to FIG. 3, in a display screen 300 of the CRT display device 3 are shown a format 301 at the uppermost portion, an identification underline 302 for allowing easy recognition of the format, a left margin symbol (L) 303 indicating the left margin position, a dot symbol (.) 304 indicating each column position, a tab position symbol (t) 305 indicating the tab set position, and a right margin symbol (R) 306 indicating the right margin position. The format displayed on the screen is obtained by editing the basic pattern 200 in accordance with the contents of the line format table by the format display control means 21. A cursor return symbol ( ◁ ) 307 indicates a line return.

In this embodiment, first to 11th lines of a sentence/sentences can be displayed on the screen. Note that a cursor K is currently at the first line of the display area. The format 301 displayed in this state indicates that the left margin is set at the first column and the right margin is set at the 40th column. When the operator inputs "FREEBIE" and depresses the cursor return key 105, the cursor K returns to the first column of the second line. The operator depresses the cursor return key 105 again so as to return to the editing job of this sentence after one extra line.

Figure 4:
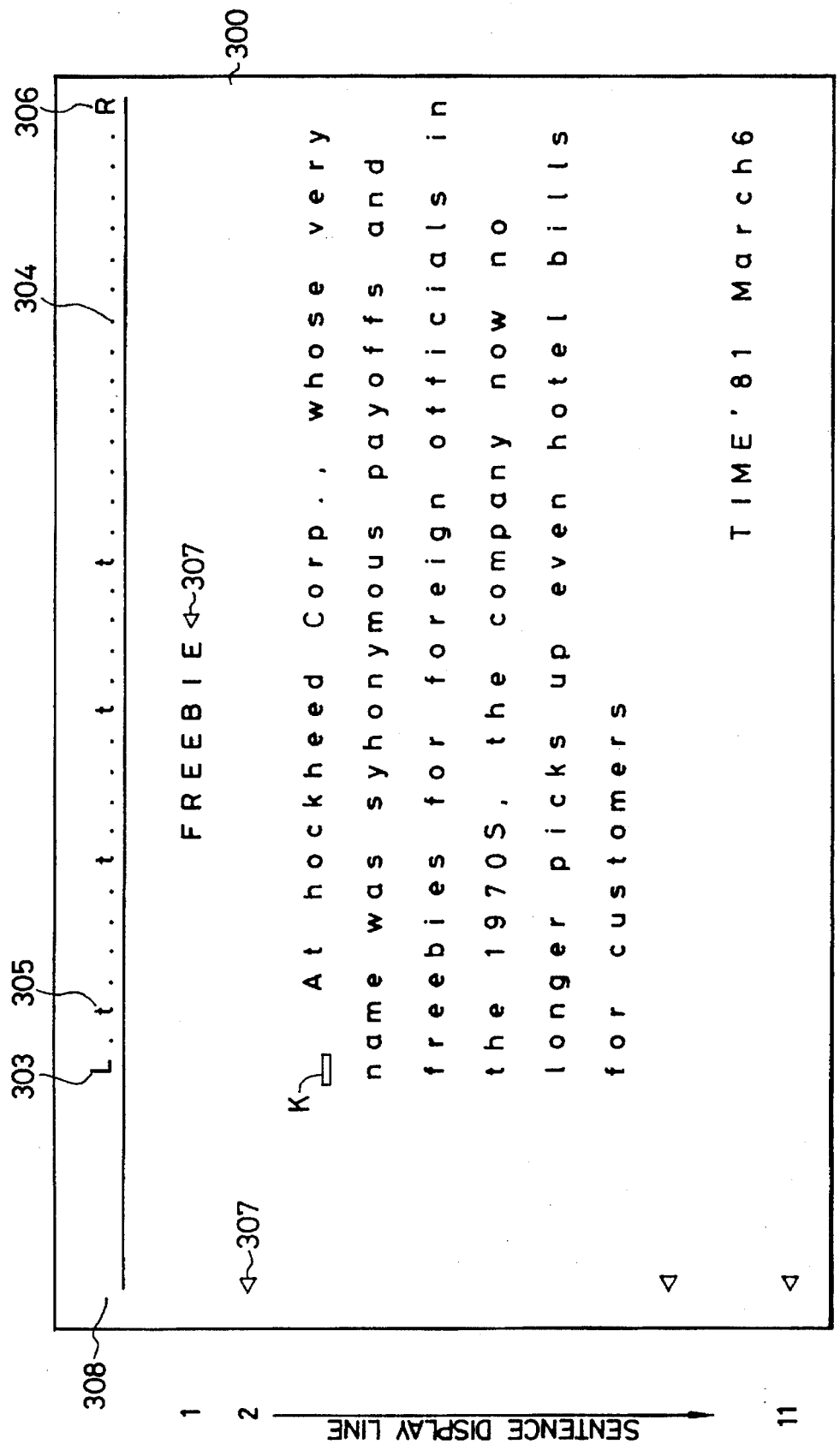
FIG. 4 is a representation showing a display when a format is changed during information display in FIG. 3.

An example of the format display at another line in the apparatus of the present invention is shown in FIG. 4. In this case, the format of the 3rd to 8th lines is different from that of the remaining lines. In the example illustrated in FIG. 4, the cursor K has been shifted to the 3rd line. In the format 308 displayed in this state, the left margin symbol (L) is displayed at the 8th column. This means that the cursor K returns to the 8th column on the 3rd line. When the cursor return symbol ( ◁ ) is referred to, it is seen that input operation is performed in accordance with the format 308 up to the 8th line, and then in accordance with the format 301 at the 9th line and thereafter. In this manner, in the apparatus of the present invention, the format of sentence display can be changed for each line.

Figure 5:
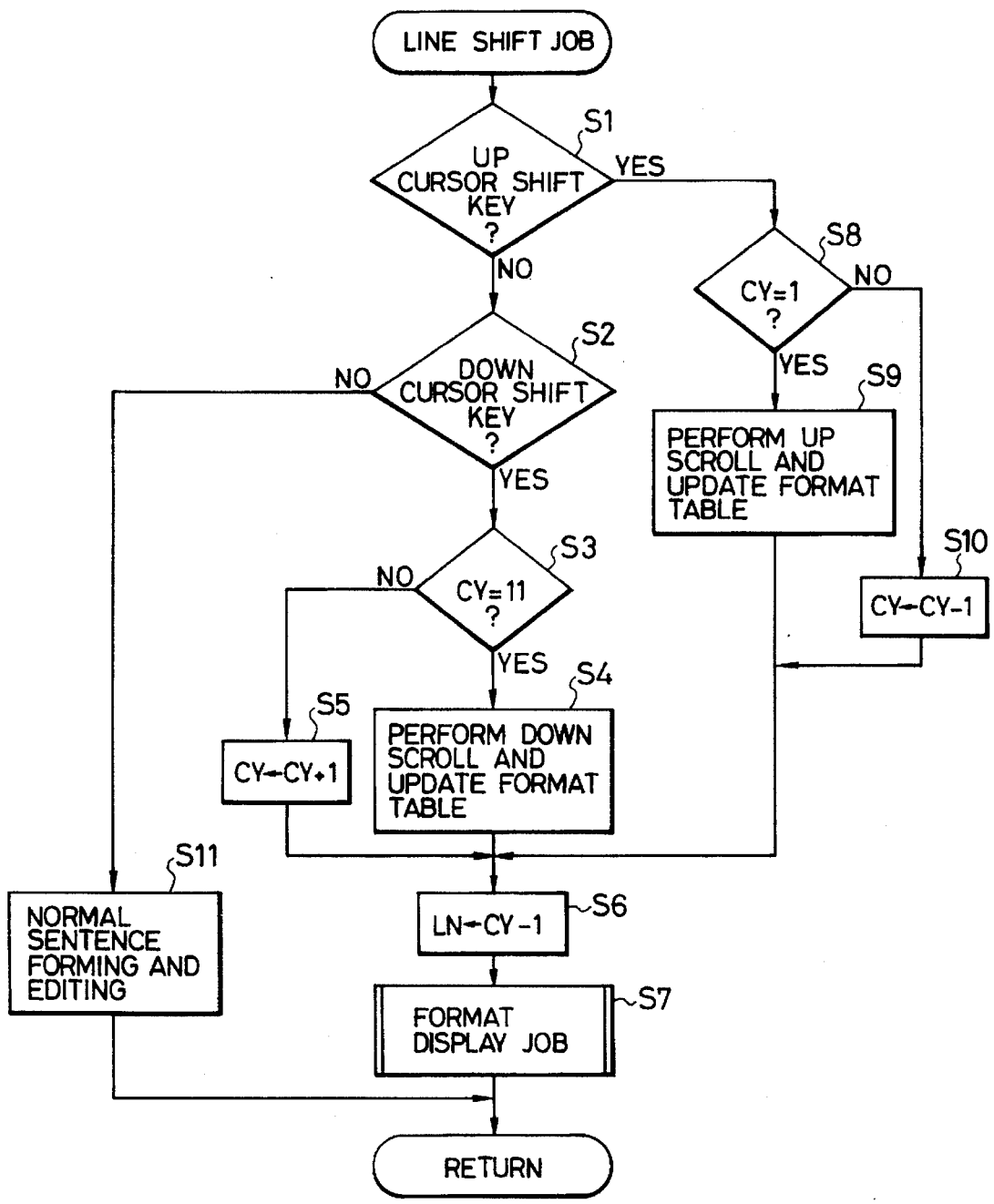
FIG. 5 is a flow chart of the processing or job for controlling the display operation by changing format information for each line.

Details of the job for changing the line format for each line are illustrated in the flow chart shown in FIG. 5. The program of this algorithm is stored in the ROM of the CPU 2 in FIG. 1. A key code input from the keyboard 1 is processed by the sentence file forming & editing means 22. In step S1, it is checked if the input key code corresponds to the up cursor shift key 101. Note that it is assumed the cursor is initially set at the upper left corner on the screen. If YES in step S1, the flow advances to step S8 and the value CY of the cursor register 202 is checked. If CY is 1, it means that the cursor K is at the uppermost line among the sentence display lines. Since it is determined in step S8 that the up scroll must be performed, the flow advances to step S9 and the up scroll operation is performed. More specifically, the currently displayed information is shifted downward by one line, and new information is displayed at the uppermost line. At the same time, the contents of the line format table (207 to 302) in the main memory 20 are also updated by up scroll operation. This is performed to allow the information of the left/right margin positions of the table to always correspond to the information of the sentence display lines on the screen. However, when it is determined in step S8 that the value CY of the cursor register 202 is not 1, the flow advances to step S10 and the value CY is decremented by 1. The display control circuit 4 shifts the display position of the cursor K by one line in accordance with the updated value CY. In step S6, the value (CY-1) is set in the value LN of the line number register 205. This is performed to access the line format table. In step S7, the format display job to be described later is performed. The format corresponding to the line at which the cursor K is currently located is displayed at the uppermost position on the screen.

If NO in step S1, it is checked in step S2 if the input key code corresponds to the down cursor shift key 102. If YES in step S2, the flow advances to step S3. In step S3, it is checked if the content CY of the cursor register 202 is 11, i.e., if the cursor K is at the lowermost line among the sentence display lines. If YES in step S3, the flow advances to step S4 to perform the down scroll operation. In this operation, scrolling is performed in the opposite direction to that in step S9. At the same time, the contents of the line format table (207 to 302) in the main memory 20 are also scrolled or updated in the opposite direction to that described above. If NO in step S3, the flow advances to step S5 to increment the value CY by 1. Then, the display position of the cursor K is shifted downward by 1 line on the screen. If it is determined in step S2 that the input key code does not correspond to the down cursor shift key 102, the flow advances to step S11 and other normal sentence formation editing is performed.

Figure 6:
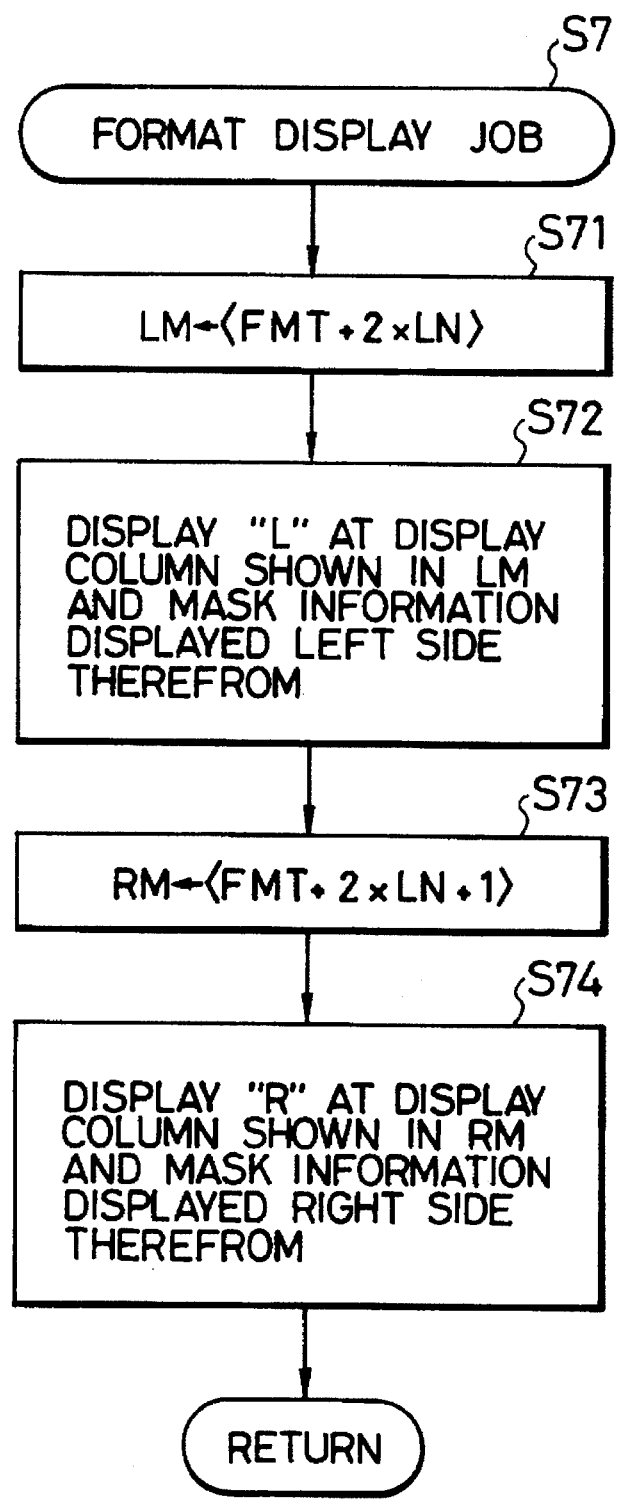
FIG. 6 is a flow chart of the format display job.

FIG. 6 shows details of the format display job in step S7 in FIG. 5. In step S71, the content (line nLM) read out from the left margin memory corresponding to the nth line (LN+1) at which the cursor K is currently located is set in the left margin register 203. FMT in step S71 indicates a start address for storing the margin in FIG. 1, i.e., a location storing data of the left margin position of the first line or the address of a line 1LM 207. As can be seen from FIG. 1, the left margins of the second line and thereafter are 207, 209 and so on and the corresponding addresses storing these left margins are calculated by (FMT+2×LN). In step S72, the display up to the column (calculated in step S71) indicated by the contents of the left margin register 203 in accordance with the displayed format is masked. In step S73, the content (line nRM) read out from the corresponding right margin memory is set in the right margin register 204. In this case, FMT indicates the start address of the memory 208 shown in FIG. 1 at which the line 1RM is stored. In step S74, the display at the right of the column indicated by the contents of the right margin register 204 in accordance with the currently displayed format is masked.

In the description of the embodiment of the present invention above, symbols (L), (R), (t), (.) and the like are used to indicate various functions of the display format. However, any other symbols can be used if they correspond to actual functions. The numbers of lines or columns displayed are not particularly limited.

In the description of the embodiment of the present invention above, only the left/right margins can be changed. However, the tab set position, the indentation set position and the like can also be changed.

Furthermore, in the above embodiment, the format information is stored in units of lines. However, the present invention is not limited to this. Thus, document information to which the same format information is applied can be defined as one block, and the format information can be set in correspondence with such a block.

Figure 7:
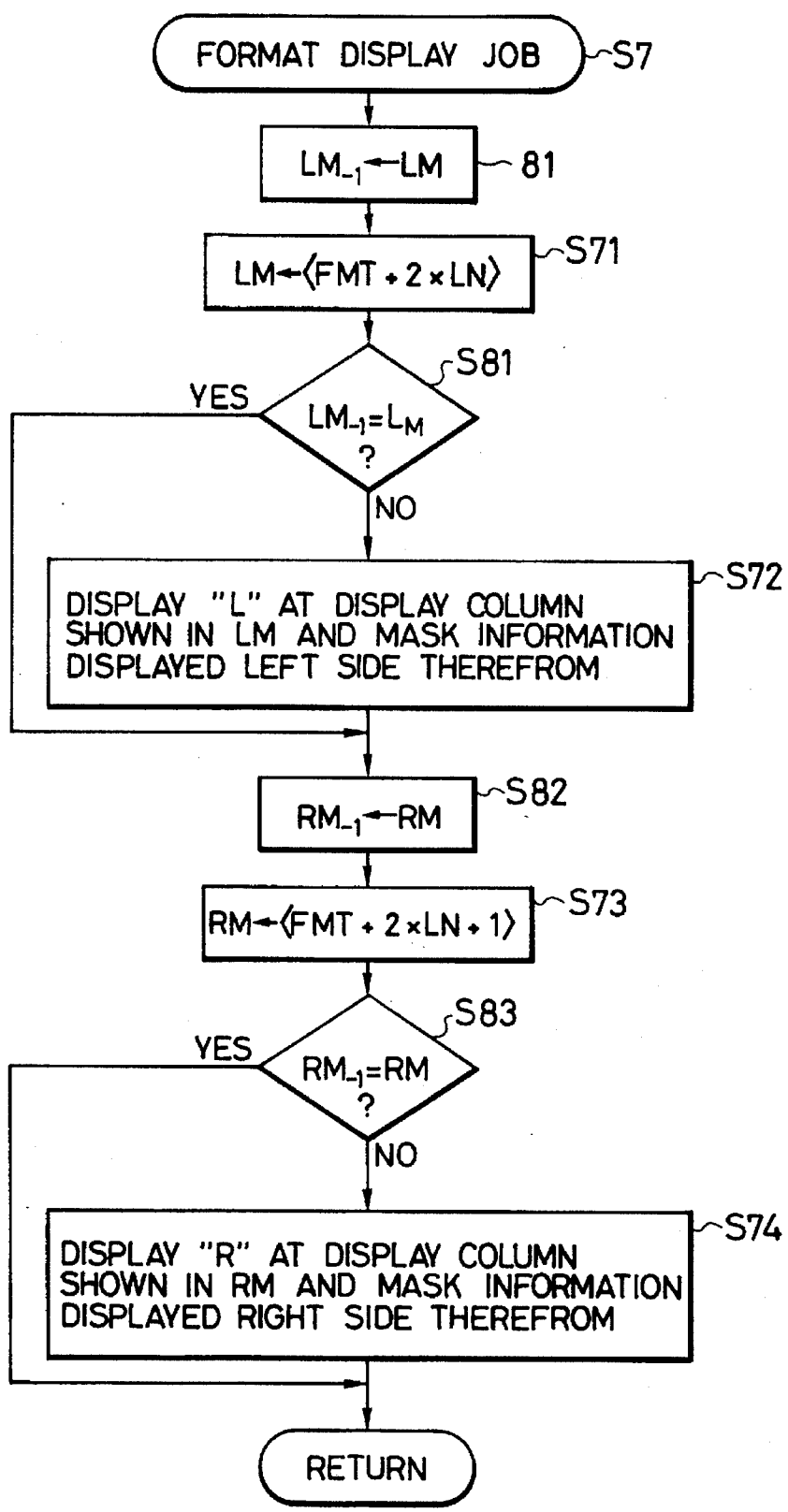
FIG. 7 is a flow chart for controlling the display operation by changing format information for each region.

In other words, in the above description, the format information of each line of document information is read out and displayed. However, when a change in the format information is not effected in an immediately preceding line or in the line preceding that one, the previous format information can be displayed to allow high-speed display control and to provide an information processing apparatus having an excellent operability. FIG. 7 shows a control flow chart in such a case. In step S1, data of the left margin of the immediately preceding line along the cursor shifting direction is stored in the register LM-1. In step S71, the left margin position in the line at which the cursor is currently located is calculated. In step S81, LM is compared with LM-1. If the left margin position in the current line is the same as that in the immediately preceding line, display control of the left margin need not be performed and the flow advances to step S82 to perform display control of the right margin. If NO in step S81, i.e., if the left margin positions in the current and immediately preceding lines are different, since the format information is different between the two lines, display control is performed in step 72 as in the case of FIG. 6. In step S82, the right margin position RM of the immediately preceding line is stored in the register RM-1. In step S83, it is checked if RM and RM-1 are the same. If YES in step S83, since the right margin position of the current line is the same as that of the immediately preceding line along the cursor shifting direction, the format of the immediately preceding line is continuously displayed without creating and displaying new format (right margin). If NO in step S83, the flow advances to step S74 as in the case in FIG. 6 so as to control the new format information.

Note that in the initial state the cursor is located at the upper left corner of the screen and corresponding data are stored in LM and RM. In this manner, if the display output of the format information is changed only when the format information must be changed, document information of the same format information is handled as one block of data. Thus, control of display output of the format information is performed only when the cursor is shifted from one region to another wherein the format information is different. As long as the cursor is located in a region wherein the format information remains the same, high-speed format display can be performed.

According to the present invention, the format of the sentence file can be controlled for each line. In addition, since the format of each line at which the cursor is located is displayed, the operator at once knows the current format and can immediately perform the desired sentence job. In addition since only a single line is required as a format display area, an extra format display line need not be included in the sentence display area and a wide sentence display area is guaranteed.

What is claimed is:

1. An information processing apparatus comprising:
   input means for inputting character information;
   memory means for storing the character information input by said input means;
   display means for displaying the character information stored in said memory means on a plurality of lines and tab format and a cursor;
   format memory means for storing respective tab format information defined for each of the plurality of lines;
   position designating means for designating, with the cursor, a display position, on said display means, in which the character information is displayed;
   means for, when said position designating means moves the cursor from one of the plurality of lines to another, reading the tab format information for the another line, which tab format information is different from that defined for the one line, from said format memory means; and
   means for controlling said display means to display respective tab format information for the line on which the cursor is positioned by said position designation means in response to the updated read tab format information read by said reading means and for controlling said display means to change the tab format information displayed by said display means based on the updated read tab format information read by said reading means when the cursor is moved to a different line by said position designation means.

2. An apparatus according to claim 1, wherein said format memory means stores the tab format information defined for each of the lines simultaneously.

3. An apparatus according to claim 1, further comprising cursor position memory means for storing position information of the cursor and switching means for switching the tab format information read from said format memory means in response to the position information stored in said cursor position memory means.

4. An apparatus according to claim 1, wherein said display means can display a plurality of lines of the character information simultaneously.

5. An information processing apparatus comprising:
   input means for inputting character information;
   memory means for storing the character information input by said input means;
   display means for displaying the character information stored in said memory means on a plurality of lines and format and a cursor;
   format memory means for storing a plurality of types of format information defined for each of the plurality of lines;

position designating means for designating, with the cursor, a display position, on said display means, in which the character information is displayed;

means for, when said position designating means moves the cursor from one of the plurality of lines to another, reading the format information for the another line, which format information is different from that defined for the one line, from said format memory means; and means for controlling said display means to display respective format information for the line on which the cursor is positioned by said position designation means in response to the updated read format information read by said reading means and for controlling said display means to change the format information displayed by said display means based on the updated read format information read by said reading means when the cursor is moved to a different line by said position designation means.

6. An apparatus according to claim 5, wherein said format memory means stores the format information defined for each of the lines simultaneously.

7. An apparatus according to claim 5, wherein said display means can display a plurality of lines of the character information simultaneously.

8. An apparatus according to claim 5, wherein said format memory means comprises an area for storing tab information and an area for storing margin information.

9. An information processing method comprising the steps of:

displaying on display means character information stored in a memory on a plurality of lines and format information stored in a format memory;

designating with a cursor, a display position on the display means in which the character information is displayed, and moving the cursor from one of the plurality of lines to another;

reading format information for the another line from the format memory means, which format information is different from the format information defined for the one line; and controlling said displaying step to display respective format information for the line on which the cursor is positioned by said position designating step in response to the updated read format information read by said reading step and for controlling said displaying step to change the format information displayed by the display means based on the updated read format information read by said reading step when the cursor is moved to a different line by said position designating step.

10. A method according to claim 9, wherein said reading step comprises switching the format information read from the format memory in response to said moving step moving the cursor.

11. An information processing apparatus comprising:

input means for inputting information;

memory means for storing the information input by said input means;

display means for displaying the information stored in said memory means on a plurality of lines and format information;

position designating means for designating a display position, on said display means, in which the information is displayed;

means for, when said position designating means moves the designated display position from one of the plurality of lines to another, updating the format information displayed by said display means, which format is different from the format of the another line, to correspond the format of the one line to the format of the another line; and means for controlling said display means to display respective format information for the line of the designated display position designated by said position designation means in response to the updated format information and for controlling said display means to change the format information displayed by said display means based on the updated format information when the designated display position is moved to a different line by said position designation means.

12. An apparatus according to claim 11, further comprising means for displaying the format updated by said updating means.

13. An apparatus according to claim 11, wherein said display means can display a plurality of lines of the information simultaneously.

14. A storage medium of an information processing apparatus storing program means for causing the information processing apparatus to control display means to automatically change displayed format information for a line of text when a cursor is moved from one of a plurality of lines to another in the event the one line and the another line have different formats, said program means in said storage medium of the information processing apparatus comprising:

means for causing the display means to display character information stored in a memory on a plurality of lines and format information stored in a format memory;

means for causing a cursor displayed on the display means to move from one of the plurality of lines to another;

means for causing the reading of format information for the another line from the format memory which format information is different from the format information defined for the one line; and means for causing the display means to display format information for the one line when the cursor is positioned on the one line and to display format information for the another line when the cursor is moved to the another line in response to the read format information and for causing the display means to change the displayed format information based on the read format information when the cursor is moved from the one line to the another line.

* * * * *

UNITED STATES PATENT AND TRADEMARK OFFICE
CERTIFICATE OF CORRECTION

PATENT NO. : 5,627,948
DATED : May 6, 1997
INVENTOR(S) : KOJI FUKUNAGA

It is certified that error appears in the above-identified patent and that said Letters Patent is hereby corrected as shown below:

ON COVER PAGE:

Under Heading "Attorney, Agent, or Firm": Fitzpatrick, Cella, Harper & Scinto" should read --Fitzpatrick, Cella, Harper & Scinto--.

COLUMN 2:
Line 58, "basic" should --basis--.

Signed and Sealed this

Eighteenth Day of November 1997

Attest:

BRUCE LEHMAN

Attesting Officer

Commissioner of Patents and Trademarks